Aug. 10, 1965     I. H. R. ROSEN ETAL     3,199,375
ARRANGEMENT IN VEHICLE AXLES ASSOCIATED WITH
A PLANETARY TYPE BEVEL GEARING
Filed May 27, 1964
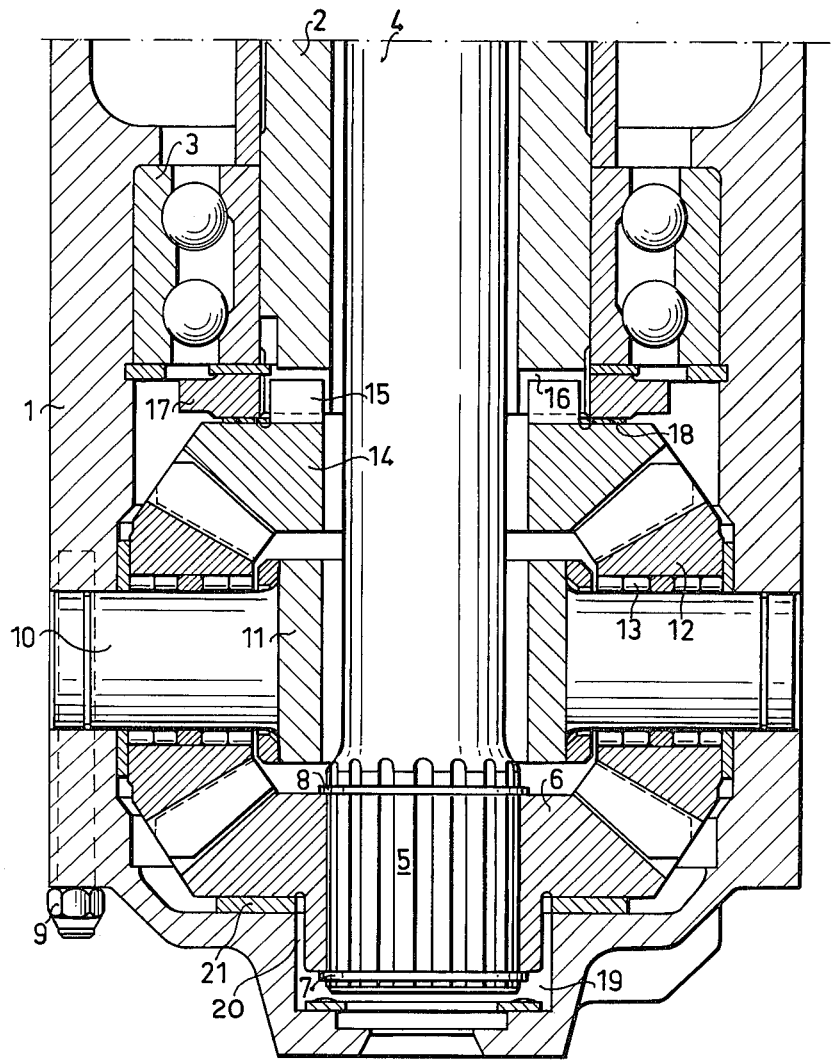
INVENTORS
Inge Harald Rune Rosen
Stig Herbert Albert Weiertz
BY
Pierce Schiffler & Parker
Attorneys

United States Patent Office 3,199,375
Patented Aug. 10, 1965

3,199,375
ARRANGEMENT IN VEHICLE AXLES ASSOCIATED WITH A PLANETARY TYPE BEVEL GEARING
Inge Harald Rune Rosen, Goteborg, and Stig Herbert Albert Weiertz, Kungalv, Sweden, assignors to Aktiebolaget Volvo, Goteborg, Sweden, a corporation of Sweden
Filed May 27, 1964, Ser. No. 370,568
1 Claim. (Cl. 74—713)

This invention relates to an arrangement in vehicle axles associated with a planetary type bevel gearing encased in a wheel hub and has especially reference to axles of heavy vehicles, such as heavy-duty and light-duty trucks. In order to obtain small radial dimensions of the hub so that vehicles wheels and brake equipment of standard dimension can be used, it is of advantage to provide the planetary gearing with bevel gears. However, unavoidable defects of the teeth are likely to result in unequal loads on the teeth of the gearing which in view of the high loads in consideration may cause damages. The object of this invention is to eliminate this inconvenience in a planetary gearing of the type referred to. In its broadest aspect the invention is characterized in that the sun gear or sun gears comprised in the gearing are radially movable so as to be able to adjust themselves relative to the planet gears, whereby to distribute the tooth pressure equally among all interengaging teeth.

An embodiment of the invention is described hereinbelow with reference to the annexed drawing which illustrates a longiutdinal sectional view of the hub associated with the planetary gearing and appertaining parts of the rear axle of a vehicle.

In a manner known per se the hub case 1 is provided with means, not shown, for connecting a ground wheel comprising a brake drum. The hub case is mounted on an axle housing 2 inter alia by means of a bearing 3, such as an angular-contact ball bearing, adapted to take both axial and radial loads. The axle 4 is disposed centrally in the housing 2 and is driven by the engine of the vehicle via a differential gear. The outer end of the axle is overhanging and extends into the hub case 1 where it is formed with splines 5 onto which a bevel gear 6 is slid. The gear 6 is fixed in axial direction by means of lock rings 7, 8 inserted into grooves at the end of the axle. The hub case 1 is divided along a radial plane and the outer part of the case is secured to the inner part by means of a plurality of bolts 9 or similar fastening members. Between these parts journals 10 of a spider 11 are clamped between corresponding recesses in the parts of the case. A planet bevel gear 12 is mounted on the journal 10 by means of a needle bearing 13. The central bore of the spider 11 is sufficiently large to permit unobstructed rotation of the axle 4 even in case of comparatively great deflection. Although in the embodiment illustrated four planet gears are considered to be sufficient for transmitting the motive power, any other suitable number of journals 10 and planet gears 12 may be used. The planet gears 12 are in mesh both with the bevel gear 6 which serves as a sun gear of the planetary gearing and with a bevel gear 14 which is located on the opposite side of the planet gears in coaxial relation to the gear 6. The gear 14 has a comparatively large central bore around the axle 4 and serves as a second sun gear or gear ring of the planetary gearing and is non-rotatably connected with the axle housing 2, such as by means of a dog clutch consisting of axial dogs 15 and recesses in the hub of the gear 14 and corresponding axial recesses and dogs 16 at the end of the housing 2. Between the bevel gear 14 and a ring 17 screwed onto the end of the housing 2 for fastening the bearing 3 there are inserted shims for accurate fixation of the axial position of the gear 14. The dog clutch has clearances between the dogs so as to enable radial movement of the gear 14.

The end of the hub case 1 has a recess 19 for the hub of the bevel gear 6. The radial extension of this recess is great enough to form a radial clearance 20 which permits free deflection of the axle 2 and the bevel gear 6. Inserted between the gear 6 and the end of the hub case 1 is a thrust race 21 which takes axial loads on the gear 6. The thrust race may be replaced by a needle thrust bearing or similar device which serves the same purpose.

The mode of operation of the gearing is as follows. The bevel gear 6 transmits the rotary movement of the axle 4 to the planet gears 12 which travel on the stationary gear 14 resulting in that the spider 11 and consequently the hub case 1 and the wheel of the vehicle are rotated at a reduced speed. In the drawing the gears 6 and 14 are of equal diameters resulting in a speed reduction of 2:1 which may be changed, however, by changing the number of teeth of the gears 6 and 14.

Due to the overhanging end of the axle 4 the axle can slightly deflect in response to varying tooth pressures between the teeth of the gear 6 and the planet gears 12. As a result, the gear 6 can be radially displaced until the tooth pressures are balanced and all teeth are equally located. As mentioned above, axial loads are taken by the thrust race 21 or by a thrust bearing provided instead thereof.

In a similar manner the bevel gear 14 can adjust itself radially relative to the planet gears resulting in that the teeth of these elements also will be equally loaded.

What we claim is:

In a driving axle for vehicles, a normally stationary axle housing, an axle extending within and rotatable relative to said axle housing, a hub case surrounding and rotatable relative to said axle housing, and a reduction gearing connecting said axle with said hub case, said gearing comprising a first bevel sun gear in splined connection with said axle, a spider having radially extending journals surrounding said axle and secured to said hub case, bevel pinions carried by said journals and meshed with said first bevel sun gear, and a second bevel sun gear concentric with said axle, meshed with said bevel pinions and non-rotatably connected to said axle housing, the connection between said second sun gear and said axle housing consisting of a dog clutch having clearances between the dogs permitting radial movement of said second sun gear relative to said axle.

References Cited by the Examiner
UNITED STATES PATENTS
2,771,791  11/56  Bachman _____ 74—713
2,786,367  3/57   Rockwell _____ 74—713

DON A. WAITE, *Primary Examiner.*